US007014105B2

(12) United States Patent
Fujioka

(10) Patent No.: US 7,014,105 B2
(45) Date of Patent: Mar. 21, 2006

(54) BILL HANDLING MACHINE

(75) Inventor: Toshinori Fujioka, Owariasahi (JP)

(73) Assignee: Hitachi, Ltd., Tokyo (JP)

( * ) Notice: Subject to any disclaimer, the term of this patent is extended or adjusted under 35 U.S.C. 154(b) by 14 days.

(21) Appl. No.: 10/395,696

(22) Filed: Mar. 25, 2003

(65) Prior Publication Data

US 2004/0026498 A1 Feb. 12, 2004

(30) Foreign Application Priority Data

Mar. 26, 2002 (JP) ............................ 2002-086418

(51) Int. Cl.
*G06F 17/60* (2006.01)

(52) U.S. Cl. ...................................... 235/379; 235/381

(58) Field of Classification Search ................ 235/379, 235/381; 705/40, 43; 902/7, 15; 382/135
See application file for complete search history.

(56) References Cited

U.S. PATENT DOCUMENTS

| | | | | |
|---|---|---|---|---|
| 4,473,157 | A * | 9/1984 | Hirose et al. | 902/7 |
| 4,479,049 | A * | 10/1984 | Hirose | 235/379 |
| 4,487,306 | A * | 12/1984 | Nao et al. | 902/7 |
| 4,524,268 | A * | 6/1985 | Fukatsu | 235/379 |
| 4,554,444 | A * | 11/1985 | Hirose | 235/379 |
| 4,678,072 | A * | 7/1987 | Kobayashi et al. | 194/206 |
| 4,744,468 | A * | 5/1988 | Goi et al. | 235/379 |
| 4,772,781 | A * | 9/1988 | Watanabe | 235/379 |
| 4,883,183 | A * | 11/1989 | Kimura et al. | 235/379 |
| 4,889,220 | A * | 12/1989 | Yoshinori et al. | 235/379 |
| 4,905,841 | A * | 3/1990 | Hirata et al. | 235/379 |
| 5,199,697 | A * | 4/1993 | Yamada et al. | 902/12 |
| 5,790,693 | A | 8/1998 | Graves et al. | |
| 6,006,209 | A * | 12/1999 | Takeuchi et al. | 705/40 |
| 6,254,083 | B1 * | 7/2001 | Abe et al. | 271/114 |
| 6,334,610 | B1 * | 1/2002 | Minamishin et al. | 271/3.04 |
| 6,394,256 | B1 * | 5/2002 | Mukai | 382/135 |
| 6,536,662 | B1 * | 3/2003 | Ohno | 235/379 |
| 6,637,647 | B1 * | 10/2003 | Katou et al. | 235/379 |
| 6,650,767 | B1 * | 11/2003 | Jones et al. | 382/135 |
| 6,749,053 | B1 * | 6/2004 | Ikuta | 194/206 |
| 2001/0020638 | A1 * | 9/2001 | Uematsu et al. | 235/379 |
| 2003/0168849 | A1 | 9/2003 | Reinisch | |

FOREIGN PATENT DOCUMENTS

| | | | |
|---|---|---|---|
| DE | 100 29 051 | A1 | 12/2001 |
| EP | 0 101 115 | A1 | 2/1984 |
| EP | 1 1546 458 | A2 | 11/2001 |

* cited by examiner

*Primary Examiner*—Uyen-Chau N. Le
(74) *Attorney, Agent, or Firm*—McDermott Will & Emery LLP

(57) ABSTRACT

The bill handling machine checks the authenticity of bills as the bills deposited through the deposit port are being conveyed. Once checked, the bills are held in a temporary stacker until a deposit command is entered by the user. When certain re-discrimination conditions are met, such as when a high proportion of the deposited bills are rejected or when the account for which the transaction is intended corresponds to an account predetermined to be in need of special attention, the bills can be checked again under different discriminating conditions without returning the bills to the user. Under certain conditions, the authenticity of bills can be checked with greater accuracy without compromising convenience by checking the bills again without the need for user input.

26 Claims, 5 Drawing Sheets

BILL HANDLING MACHINE

BACKGROUND OF THE INVENTION

1. Field of the Invention

The present invention relates to a bill handling machine for deposits and withdrawals of bills.

2. Description of the Related Art

Cash automatic transaction machines (ATMs) are used to receive and dispense moneys to users via bill handling machines or the like. ATMs house bill handling machines for supplying, storing, and dispensing paper money or bills. For deposits, the bill handling machine discriminates the denomination and authenticity of the bills supplied through the deposit port, bills that are determined to be genuine are temporarily stored in a temporary stacker, and any other bills are rejected through the deposit port. Authentication is based on the optical properties, electromagnetic properties, paper thickness, or the like of the bills. When the user subsequently confirms the amount of the deposit, the bills stored in the temporary stacker are stored into storage boxes corresponding to the denomination, by the bill handling machine. In addition, the ATM communicates the amount of the deposit, the account information, and the like to a host computer.

SUMMARY OF THE INVENTION

Recent increases in the accuracy of counterfeit bills have resulted in a greater possibility of counterfeit bills being mistakenly identified as genuine bills by conventional discrimination processes. Measures for preventing such erroneous determinations include methods involving more stringent criteria for determining the authenticity of bills, and methods involving more detailed image data used in such discrimination.

In the former method, however, making more stringent determination criteria can cause genuine bills which have been damaged by use to be erroneously identified as counterfeit. In the latter method, the use of greater amounts of data for discrimination can make the discrimination process take a longer time. Either option would reduce the convenience of bill handling machines.

An object of the present invention is to increase accuracy in the discrimination of the authenticity of bills without unduly reducing the convenience of bill handling machines.

To overcome at least some of the above problems, the bill handling machine of the present invention checks deposited bills again when predetermined conditions (referred to below as re-discrimination conditions) are met. The bill handling machine of the invention determines the denomination and authenticity of bills that are fed through the deposit port as they are being conveyed. Checked bills are temporarily held in a holding component until receiving a deposit command. The holding component may be provided for temporarily holding the bills, or the deposit port may be used for that purpose. The re-discrimination process referred to above is performed when predetermined re-discrimination conditions are met in that state. Ordinarily, when bills cannot be determined to be authentic during a deposit, the bill handling machine returns these bills through deposit port to the user, and bills that is re-inserted by the user is checked again. By contrast, in the present invention, the bill handling machine checks the bills again without returning the deposited bills through the deposit port to the user.

The re-discrimination process carried out by the bill handling machine of the present invention can improve the accuracy of checking the authenticity of bills. Because the re-discrimination process is not carried out all the time but only when re-discrimination conditions are met, it is possible to avoid taking a longer time to check the bills, without reducing the convenience of the bill handring machine. Because this invention cheks the bills again without being returned to the user, it doesn't bother the user by requiring inconvenient or additional operations.

A variety of re-discrimination conditions can be set in the invention.

For example, the re-discrimination process may be performed during transactions associated with bills deposits to an predetermined account that is required of special attention (Hereinafter referred to as a "special attention account"). A special attention account is one to which there is some likelihood of having counterfeit bills deposited, and can be predetermined according to transaction history or the like. Special attention account may be pre-recorded in the bill handling machine or in the host computer connected by a communications line. An advantage of the latter option is that the re-discrimination conditions for several bill handling machines can be simultaneously updated with relative ease. Also, the determination as to whether or not the account is special attention account can be done by the bill handling machine or by the host computer. If done by the host computer, the re-discrimination process should be performed upon a determination by the bill handling machine that the re-discrimination conditions have been met when information indicating that the account is a special attention account is received.

In an alternative example, the re-discrimination process may be performed when more than a predetermined number of bills is determined not to be authentic in the prior discrimination process. The predetermined number or a percentage can be determined according to the number of deposited bills. This will allow bills not determined to be authentic to include bills which have been determined to be counterfeit in the authenticity discrimination process as well as bills which have been determined to be questionable because their authenticity cannot be sufficiently determined.

In the present invention, the re-discrimination process may be performed under the same discriminating conditions as in the prior discrimination process, but the conditions are preferably different. The discrimination of authenticity under diverse conditions can improve the accuracy of such discrimination.

The discrimination conditions can be modified in a number of ways.

In a first embodiment, the resolution of the image data is preferably increased during the re-discrimination process when discrimination is based on scanned image data of the bills during the discrimination performed by the bill handling machine. Increasing the resolution can increase the discrimination accuracy.

In this scenario, the bills are scanned with low resolution during the initial discrimination process, and are scanned again with high resolution during the re-discrimination process. High resolution scanned images can be retained from the very beginning, although image data of low resolution is still used in the initial discrimination process. An advantage of the latter option is that the process is simpler because there is no need to convey the bills again for the re-discrimination process. When scanned with high resolution, the bills should be conveyed at a lower rate according to the speed at which the image data can be obtained.

In a second embodiment, the re-discrimination process may include a variety of discrimination processes different from the previous process. The discrimination of authenticity can be based on a variety of methods such as analysis of image data or comparison with optical properties relative to light of a given wavelength, magnetic properties, surface roughness patterns, or counterfeit patterns of recorded counterfeit image characteristics. Accuracy can be improved by including a variety of discrimination processes in the re-discrimination process which were not performed in the previous process. The re-discrimination process may involve omitting the previous discrimination process and changing to a new type of discrimination process, or it may involve adding new types of discrimination processes to the previous process.

In a third embodiment, the way in which the bills are conveyed may be changed during the re-discrimination process. When the discrimination process is based on data obtained from a portion of the bills, such as discrimination based on optical properties, the way in which the bills is conveyed can be altered to change the area used in the discrimination process and improve the discrimination accuracy. Changes in the way the bills is conveyed can include shifting the position of the bills in the direction at right angles to the direction in which it was conveyed, tilting the bills in the direction in which it is conveyed, or turning the bills over.

In the bill handling machine of the invention, it is possible to re-discriminate just those bills which are determined to be not genuine by the previous discrimination process. It is also possible to again check all the bills being held, regardless of the results of the previous discrimination process. In the latter option, bills erroneously determined to be genuine in the previous discrimination process can be discovered in the re-discrimination process, thus increasing the accuracy of the discrimination process. Bills for which the results of authenticity discrimination are known through repeated discrimination may be checked again or may be given priority over discrimination that is performed later.

The present invention is not limited to the bill handling machines described above and is capable of being constructed in a variety of embodiments. For example, the method for controlling the bills discrimination process may be built into the bill handling machine. It may also be constructed in the form of computer programs for executing such control by computer, as well as recording media on which such programs are recorded. Examples include a variety of computer-readable media, such as floppy disks, CD-ROM, DVD, magnetic optical disks, IC cards, ROM cartridges, punch cards, bar codes and other printed materials on which codes are printed, internal computer memory devices (memory such as RAM or ROM), and external memory devices.

DESCRIPTION OF THE PREFERRED EMBODIMENTS

Embodiments of the invention are described below.

Figure 1:
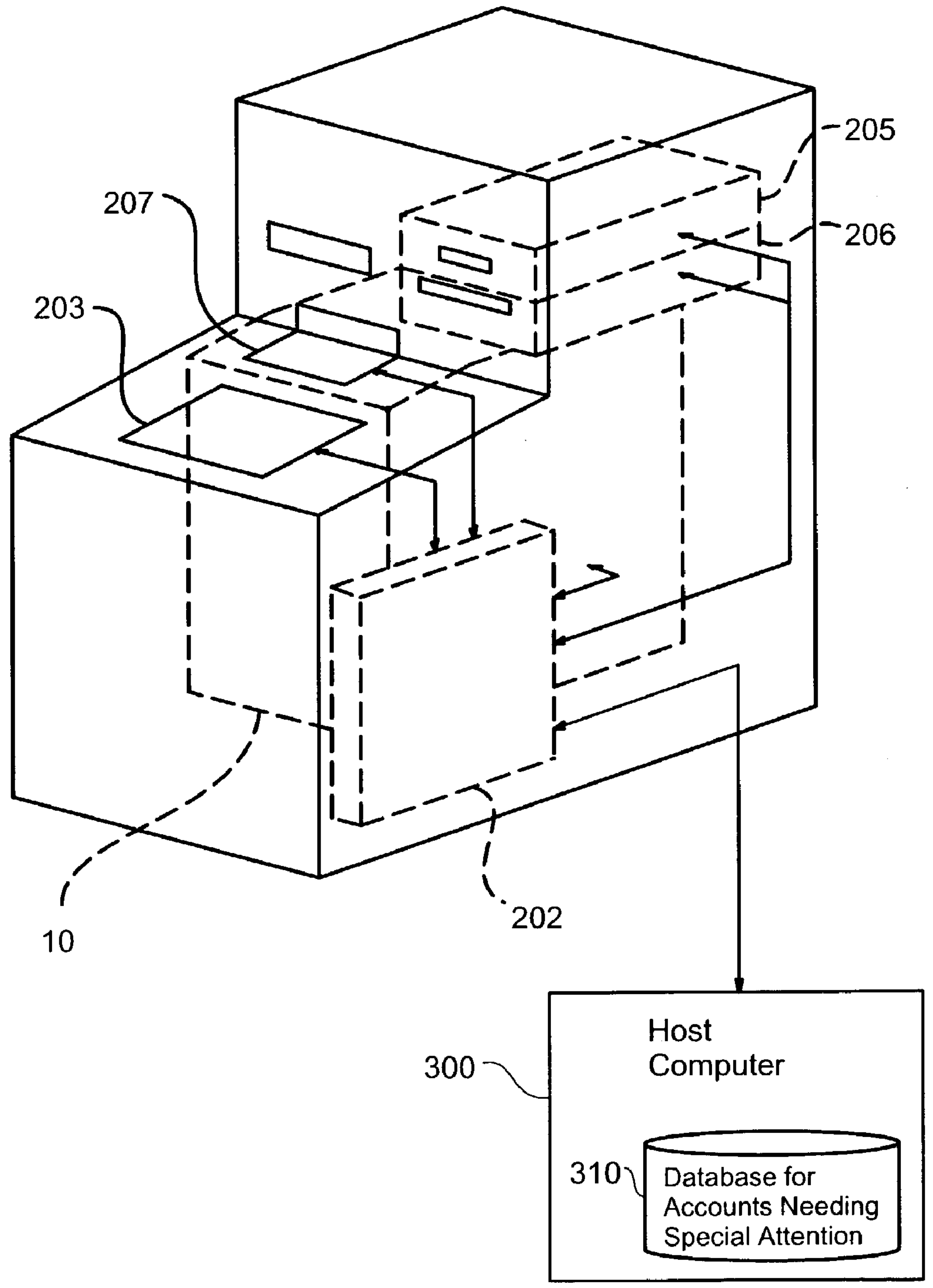
FIG. 1 is a schematic illustration of the structure of a automatic transaction machine.

A. Overall Structure;

FIG. 1 is a schematic illustration of the structure of a automatic transaction machine in the present embodiment. The automatic transaction machine is a device that is located at banks or the like for users to operate in making deposits.

The automatic transaction machine (ATM) of the present embodiment is furnished with the following units in the illustrated layout. A card transaction machine 205 reads data recorded on magnetic strip cards such as what are referred to as cash cards. The data recorded on the card includes, for example, the financial institution number, type of account, user account number, and the like.

The operating component 203 is a user interface for displaying information for deposit/withdrawal transactions and input for making deposits. Although a touch panel is used in this embodiment, combinations of displays and push button switches or the like can also be used.

Bills are given to and received from the user through a bills deposit port 207. Bills that are deposited by the user through the bills deposit port 207 when making a deposit is inspected by an internally housed bill handling machine 10 and stored storage boxes corresponding to denominations. During withdrawals, the bill handling machine 10 dispenses bills in the amount designated by the user, to the user through the bills deposit port 207. A transaction receipt-issuing mechanism 206 issues receipts of the transaction details.

The operations of the units in the ATM 100 are controlled by a control unit 202. The control unit 202 is composed of an internal microcomputer equipped with memory and a CPU. The control unit 202 gives and receives information to the various units as indicated by the arrows in the figure to control the operation of the ATM as a whole. The control unit 202 is connected by a communications line to a host computer 300. The control unit 202 transmits transaction-related data to the host computer 300, so that processes such as deposits to and withdrawals from the user account are carried out by the host computer 300.

In this embodiment, the ATM performs the re-discrimination process for deposited bills under certain conditions, such as when a transaction is carried out for accounts predetermined to be in need of special attention, as described below. The host computer 300 is provided with a database 310 of special attention account, allowing the ATM to determine whether or not the intended account is in need of special attention through communication with the host computer 300.

Figure 2:
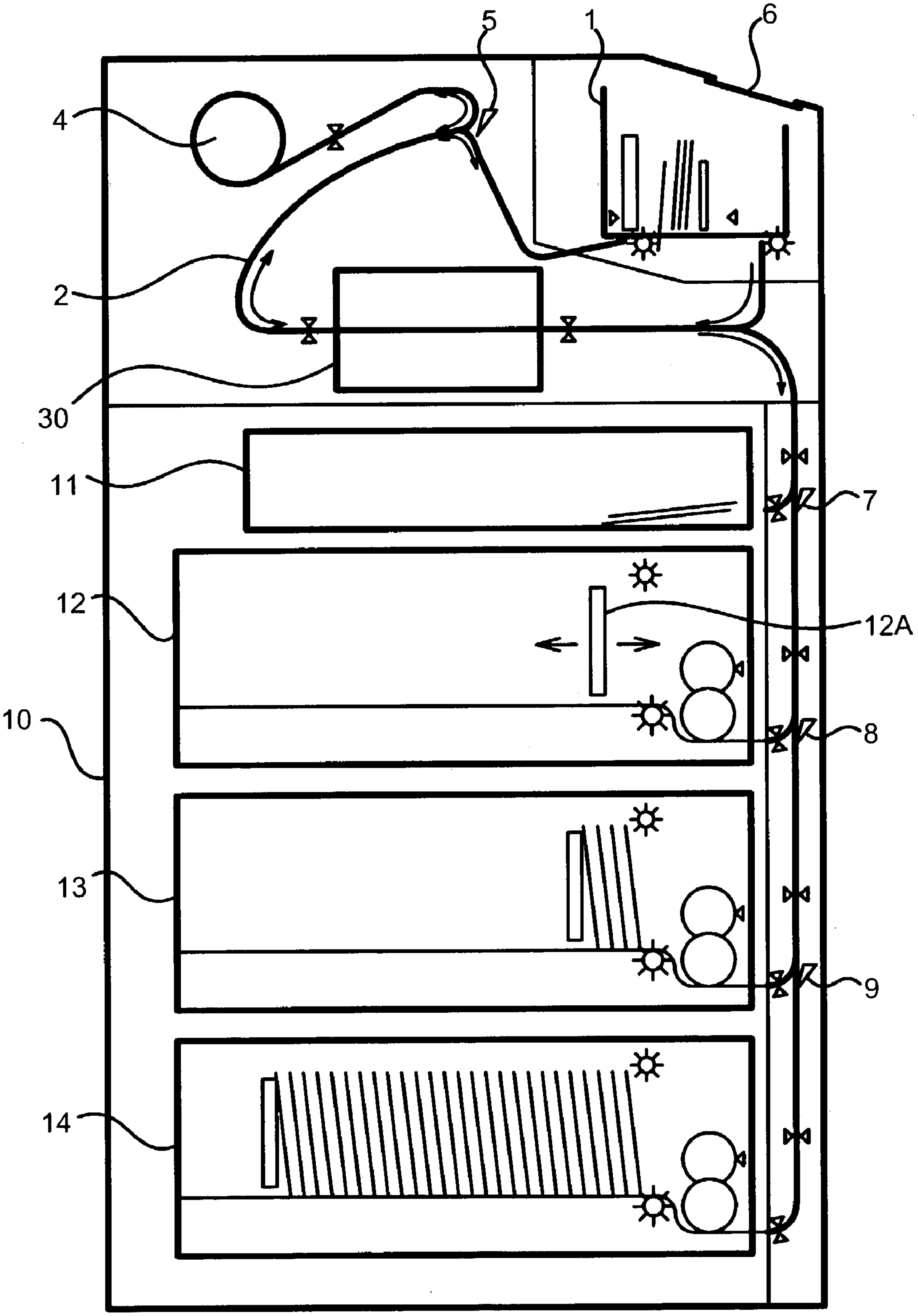
FIG. 2 is a schematic side cross section of the structure of a bill handling machine 10.

B. Bill Handling Machine;

FIG. 2 is a schematic side cross section of the structure of the bill handling machine 10. A deposit/withdrawal component 1 is a slot through which bills are given to and received from the user. The insert opening of the deposit/withdrawal component 1 is provided with a shutter 6. The shutter 6 automatically opens and closes in conjunction with the bills deposit port 207 of the ATM described above.

The interior of the bill handling machine 10 is provided with storage boxes 12 through 14 for storing legitimate bills (hereinafter referred to as genuine bills) which can be used for withdrawals, a reject box 11 for holding bills determined to be abnormal (hereinafter referred to as rejected bills), and a temporary stacker 4 for temporarily holding bills as it is conveyed in the machine.

The denominations stored in the storage boxes are predetermined by the storage cache units. The storage box 12 is provided with a slidable push plate 12A for holding the bills in an orderly fashion so as to ensure that the sequence in which the bills are arranged in the box does not become disorganized. The other storage boxes 13 and 14 are also provided with similar push plates.

Bills are conveyed by means of a conveyor 2 between the deposit/withdrawal component 1 and storage boxes. The conveyor 2 is a mechanism for conveying bills using a conveying mechanism such as a roller or belt. The circuit of the conveyor 2 is provided with gates for switching the destination to which the bills are conveyed. Gate 5 switches between the temporary stacker 4 and the deposit/withdrawal component 1. Gate 7 switches the conveyance destination to the reject box 11. Gates 8 and 9 switch the conveyance destination to storage boxes 12 through 14.

A discriminating component 30 is provided on the circuit of the conveyor 2. The discriminating component 30 employs an optical sensor or other sensor to check each bill that passes through one at a time, and outputs the results. The results of the discrimination include the denomination of the bills, its genuineness, and the like.

Figure 3:
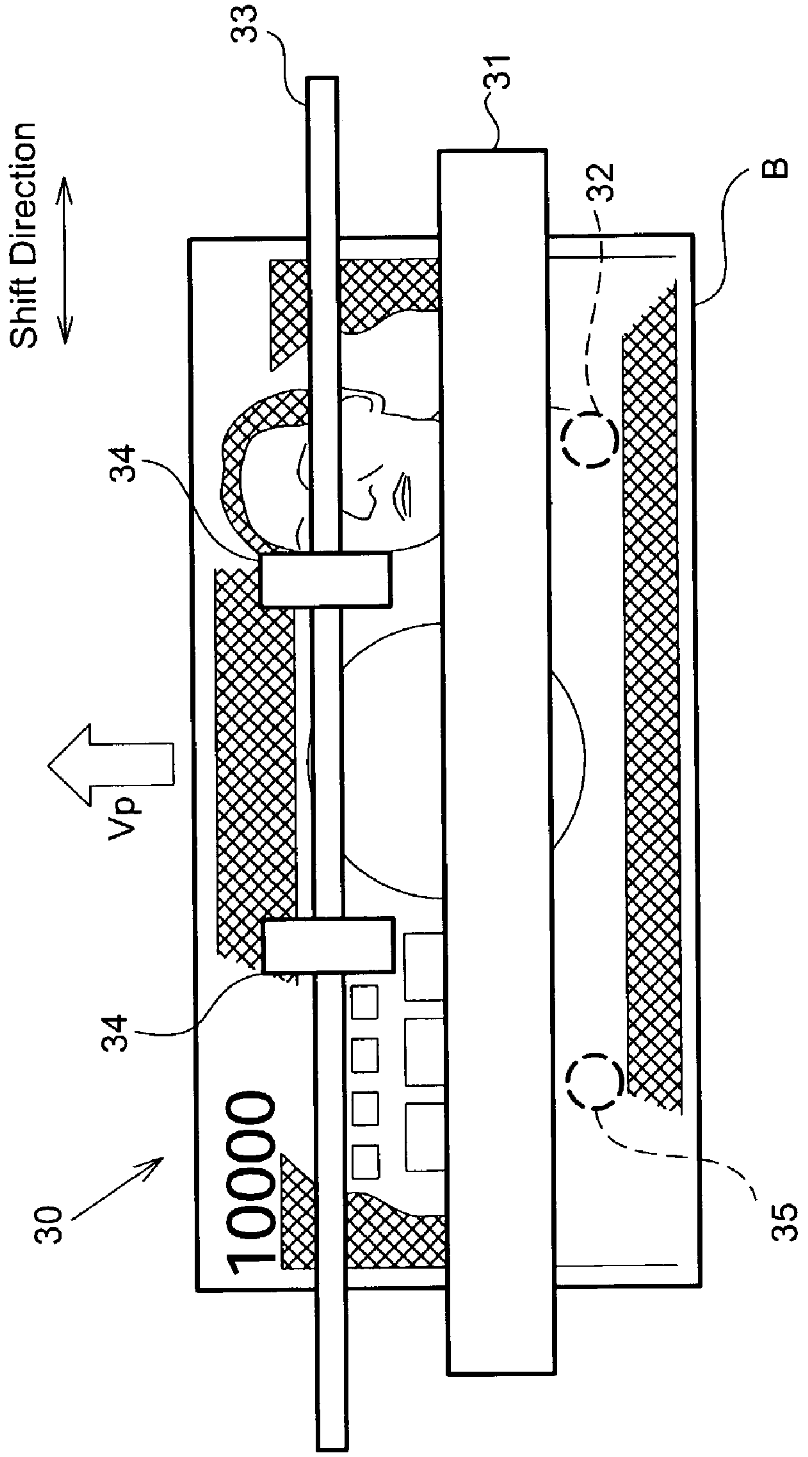
FIG. 3 is a schematic diagram of the structure of the discriminating component 30.

FIG. 3 is a schematic diagram of the structure of the discriminating component 30. The illustration is a plan of the discriminating component 30 viewed from above. The bill handling machine conveys the bill B, by means of a roller 34 attached to a rotating shaft 33, at a rate Vp in the direction indicated by the arrow in the figure. An image sensor 31 optically scans the entire surface of the bill B. The scanned image data is used to check the dimensions and determine the denomination and authenticity. The image sensor 31 can scan the bills in two modes: low resolution mode or high resolution mode. The conveying speed Vp in high resolution mode is controlled along with the mode selection so that the conveying speed Vp is lower than that in low resolution mode. In this embodiment, the conveying speed in high resolution is about half of that in the low resolution mode.

A magnetic sensor 35 detects the magnetic properties of the bills B. An optical sensor 32 detects the spectroscopic properties when the bill B is irradiated with UV rays. Because the magnetic properties and spectroscopic properties of the bill B are read immediately under the sensors in the direction in which the bills are conveyed, shifts in the bill B can affect the results of discrimination. In this embodiment, optical and magnetic pattern image data, the dimensions, and the spectroscopic properties relative to light of a specific wavelength are used to discriminate the authenticity of bills, but methods other than these may also be employed. Additionally, the number and disposition of the sensors are not limited to the illustrated examples, and can be established as desired.

The discrimination process takes place when deposits are counted, when deposits are accepted, and when withdrawals are made. The deposit counting process is a process in which bills are conveyed to the temporary stacker 4 as the bills from the deposit/withdrawal component 1 are counted. The deposit accepting process is a process that takes place after the user checks the counted funds and the deposit display is shown, wherein the bills in the temporary stacker 4 are stored by denomination in storage boxes 12 through 14. Withdrawal is a process in which bills are withdrawn from storage boxes 12 through 14. Bills that are determined by the discriminating component 30 to be abnormally supplied, bills that are determined to be extremely defaced, or the like are handled as rejected bills. Bills that are determined to be rejected bills during deposit acceptance or withdrawal are stored in the reject box 11. Bills that are determined to be rejected bills when a deposit is counted are returned to the deposit/withdrawal component 1.

Although not shown in the figure, a control unit is provided in the interior of the bill handling machine 10. The control unit is constructed in the form of a microcomputer equipped with memory and a CPU, and controls the operation of the bill handling machine 10, including the discrimination process by the discriminating component 30, according to a program prepared in advance.

Figure 4:
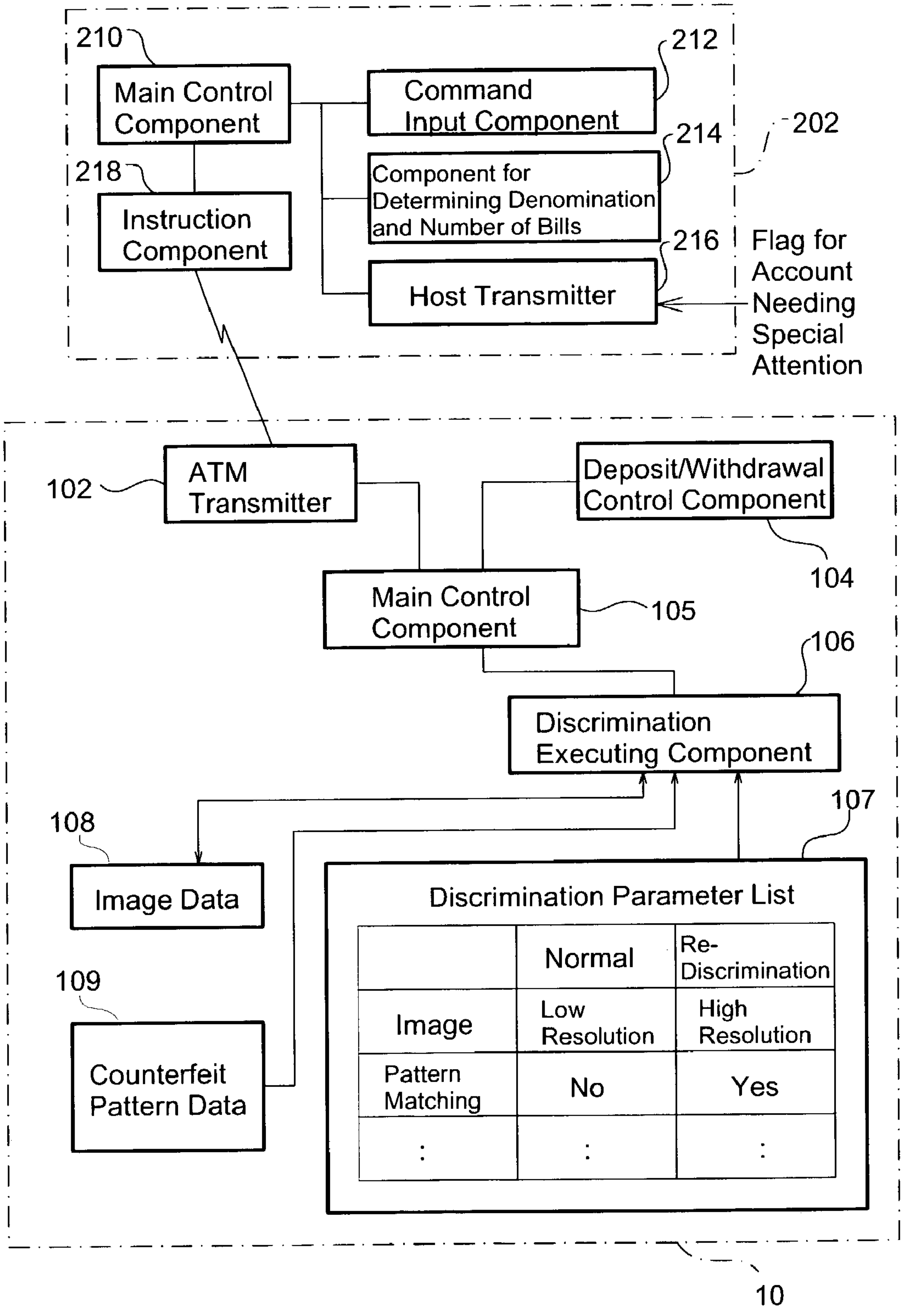
FIG. 4 is a block diagram of the functions of the ATM and bill handling machine 10.

C. Functions;

FIG. 4 is a block diagram of the functions of the ATM and the bill handling machine 10. The various functions in the block diagram are based on software in the ATM control unit 202 and the control unit of the bill handling machine 10. The functions can also be based on hardware.

The ATM functions in the following manner under the control of a main control component 210. A command input component 212 inputs commands from the user. Examples include commands to select details of the transaction, to verify the amount of bills during deposits, the amount of bills to be withdrawn, and so forth. Information on the account targeted for deposits and withdrawals is obtained from a cash card or the like. A component for determining the denomination and number of bills establishes the number of bills 214 withdrawn by denomination based on the amount indicated. A host transmitter 216 communicates various types of transaction-related information to the host computer 300. Information transmitted from the ATM to the host computer 300 includes the account targeted by the transaction, the amount of funds deposited or withdrawn, secret codes, and the like. The information transmitted form the host computer 300 to the ATM includes flags drawing attention to certain accounts. A flag of attention indicates whether or not an account targeted by a transaction corresponds to an account in need of special attention. The various types of information thus obtained are transmitted via a display 218 to the bill handling machine 10.

The bill handling machine 10 functions in the following manner under the control of the main control component 105.

An ATM transmitter 102 controls the transmission and reception of information at the display 218. For example, details of commands from the control unit 202 of the ATM are transmitted to the main control component 105, or the results of processing by the bill handling machine 10 are transmitted to the control unit 202. A deposit/withdrawal control component 104 carries out processes such as deposit counts, deposit acceptance, and withdrawals.

A discrimination executing component 106 identifies bills by controlling the discrimination component 30. Image data 108 scanned by the image sensor 31 is held for use in discriminating the authenticity of bills. In this example, only bills that have already undergone a discrimination process are checked again, as described below. The re-discrimination process is carried out under different discriminating conditions. The discriminating conditions are pre-established in a discriminating parameter list 107. An example of discriminating conditions is given in the figure. In this example, discrimination based on bill image data 108 is established so that low resolution image data is normally used, and high resolution image data is used during the re-discrimination process. The process of matching counterfeit patterns is done during the re-discrimination process, not during the ordinary process. The process of matching counterfeit patterns is a process of discriminating authenticity by comparing pre-recorded counterfeit pattern data, that is, image data characteristic of counterfeit bills, and the image data 108. The discrimination executing component 106 references the discrimination parameter list 107 to switch the discriminating conditions between the ordinary discrimination process and the re-discrimination process.

D. Deposit Process

Figure 5:
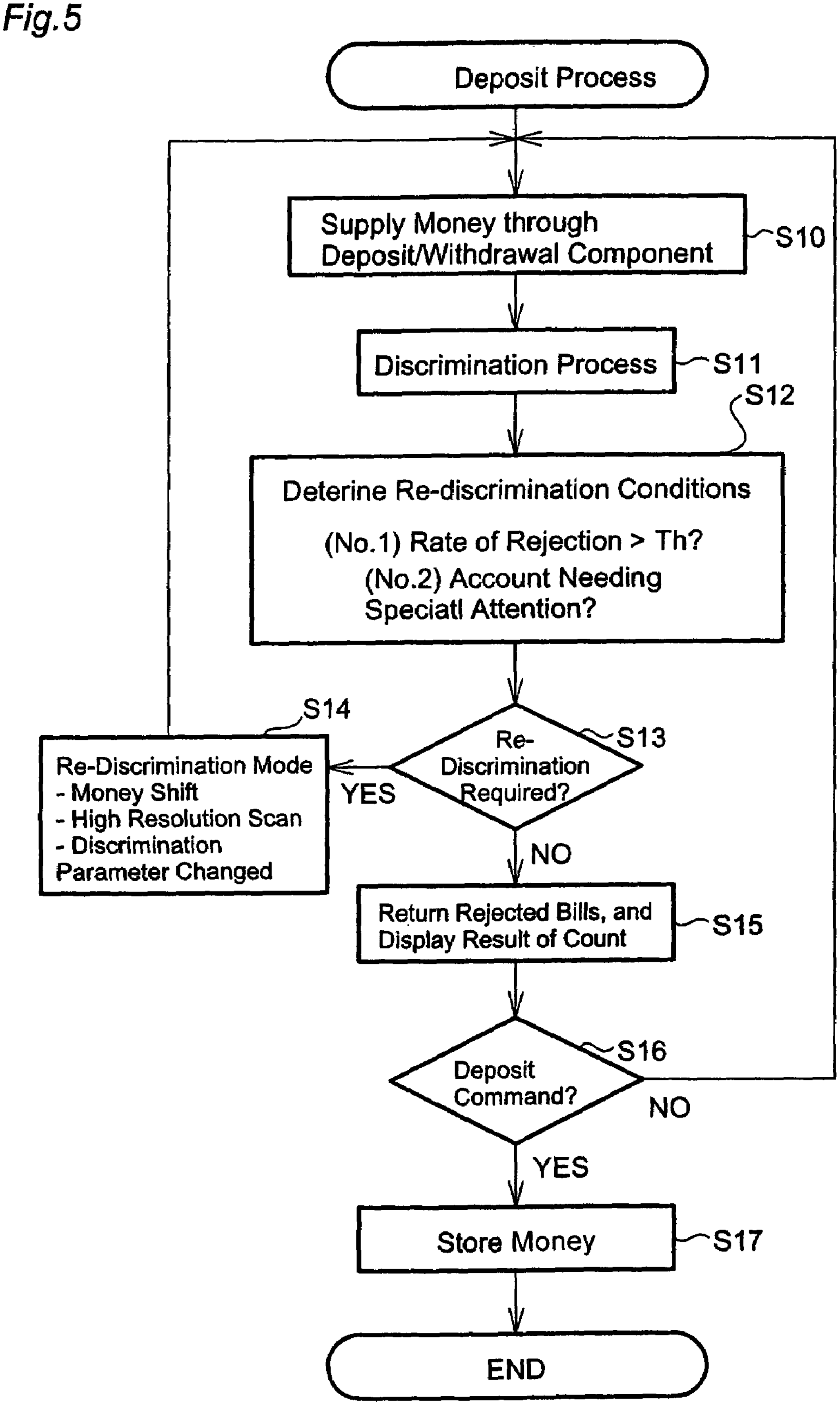
FIG. 5 is a flow chart of a deposit process.

FIG. 5 is a flow chart of a deposit process. The process is executed by the control unit of the bill handling machine 10. The process begins when the user selects a transaction associated with a deposit, such as a "deposit" or "transfers" at an ATM, triggering the insertion of bills into the deposit port 1.

When the process starts, the control unit takes the bills from the deposit port 1 (step S10) and performs a discrimination process (step S11). At this timing, the discrimination process is carried out based on the usual conditions in the discrimination parameter list 107 noted above. Bills that are determined to be genuine are stored in the temporary stacker 4, and bills that are determined to be rejected bills are returned to the deposit port 1.

When all the bills has been checked, the control unit determines whether or not the predetermined re-discrimination conditions have been met (step S12). An example of re-discrimination conditions is given in the figure. In this example, the re-discrimination conditions are met when at least either the rate of rejection is greater than a certain value Th (%) (condition No. 1) or the account intended for the transaction is one in need of special attention (condition No. 2). The rate of rejection is the proportion of bills determined to be rejected bills out of the all the bills that has been checked. The certain value Th can be set to any value, including 0. For example, it can be set to a range greater than the maximum value for the rate of rejection statistically obtained when only genuine bills are used. The re-discrimination conditions are not limited to the rate of rejection illustrated here, and can be set in a number of ways.

In this example, the host computer 300 determines whether or not an account requires special attention (hereinafter referred to as a special attention account). The host computer 300 receives the account number targeted for the transaction from the ATM, records it in the database of special attention account 310 to check whether or not the account requires special attention, and sends the results in the form of a flag of attention to the ATM. The control unit can determine whether or not the account requires special attention based on such flags. The database of special attention account 310 can be stored in the control unit, and the control unit itself can make the above determination by reference to the database.

When the above conditions are met, that is, when it is determined that a re-discrimination process is necessary (step S13), the control unit carries out the re-discrimination process. At that time, the discrimination conditions are switched to re-discrimination mode (step S14) based on the previously described discrimination parameter list 107. In this example, the image sensor 31 is in high resolution mode, and counterfeit pattern matching is added as a new discrimination parameter. In conjunction with this, the position in which the paper is conveyed is shifted.

In this way, the control unit again carries out the process from steps S10 to S13. The re-discrimination process may target only bills that are returned to the deposit port 1, that is, bills determined to be rejected bills in the initial discrimination process, but in this example, all the bills, including the bills in the temporary stacker 4, are targeted. In other words, the control unit temporarily returns all the bills in the temporary stacker 4 to the deposit port 1, and all the bills are then conveyed back from the deposit port 1 through the discrimination component 30 to carry out the re-discrimination process. The re-discrimination process is carried out while the shutter 6 of the deposit port 1 remained closed, without returning the rejected bills to the user.

During the re-discrimination process, the control unit discriminates the authenticity of the bills based on high resolution scans of images in the re-discrimination process (step S11). High resolution scans of images allow authenticity to be discriminated in greater detail and with greater accuracy. The process is also based on comparison with counterfeit pattern data, not comparison of matches between genuine bills and the image data that has been obtained. The discrimination parameters can also be increased to increase discrimination accuracy. Furthermore, because the position in which the bills are conveyed has been shifted, the discrimination process based on magnetic and spectroscopic properties can be carried out on different areas of the bills than in the first discrimination process. Carrying out the discrimination process in this manner on different areas of the bills can improve the accuracy of discriminating authenticity during the re-discrimination process. In this example, the discrimination process was based on magnetic and spectroscopic properties during the re-discrimination process, but these may also be omitted.

After the discrimination process (step S11), the control unit again determines the re-discrimination conditions (step S12). The determination as to whether or not re-discrimination is necessary can be made under the same conditions as the first time or under different conditions. A maximum number of re-discrimination processes may be established. In this example, the re-discrimination process is limited to one time, so that the re-discrimination process is unconditionally determined to be unnecessary in steps S12 and S13.

In step S13, when no re-discrimination process is determined to be necessary, the control unit returns the rejected bills to the user and displays the count of bills determined to be genuine (step S15). When the user confirms the results and enters a deposit command (step S16), the control unit stores the bills held in the temporary stacker 4 into the storage boxes (step S17). In conjunction with this, contact is made with the host computer 300, and the transaction process is complete. When the user indicates a transaction such as an additional deposit, the process starts again from step S10. In this case, the discrimination process starts again from normal mode.

When the re-discrimination conditions are met in the ATM and bill handling machine in the example described above, the re-discrimination process of the bills can improve the accuracy in the authenticity discrimination process. Because the re-discrimination is not ordinarily carried out, the inconvenience of taking a longer time in the discrimination process can be avoided.

E. Variants;

In this example, the bills are scanned in low resolution mode during the ordinary scanning process, and they are scanned again in high resolution mode during the re-discrimination process. The bills may also be scanned in high resolution mode during the initial scanning process, and the image data may be held during the normal discrimination process. The authenticity can be discriminated with low resolution image data, and then during the re-discrimination process, the authenticity can be discriminated with the source data that has been held. This will allow the re-discrimination process to be carried out without conveying the bills again.

In this example, when the bills that are determined to be counterfeit in the re-discrimination process includes bills that are not registered in the counterfeit pattern data, the control unit may perform the additional process of transmitting the image data to the host computer 300. This will allow the counterfeit pattern data to be made more complete.

In this example, the discrimination conditions are switched between normal and re-discrimination processes (step S14 in FIG. 5). Changes in the discrimination conditions are not limited to the parameters given as examples in FIG. 5. It is possible to switch just some of these conditions or to switch conditions other than the parameters given as examples. The switching of the discrimination conditions itself can be omitted, and the re-discrimination process may be carried out under the same conditions as during the ordinary discrimination process.

Various examples of the invention are described above, but the invention is not limited to these examples alone and can assume a variety of forms within the scope of the invention. For example, the above control processes can be run based on hardware in addition to being run on software.

In the present invention, a re-discrimination process is carried out, allowing the accuracy of discriminating the authenticity of bills to be increased. Because this re-discrimination process is not carried out all the time but only when re-discrimination conditions are met, it is possible to avoid taking a longer time to check the bills, without compromising the convenience of using such a machine. Because the bills are checked again without being returned to the user, the user is not inconvenienced by additional operations.

What is claimed is:

1. A bill handling machine for handling bills, which is operated by a user, comprising:

a deposit/withdraw port configured to allow a deposit of bills and a return of the deposited bills;

a discrimination component configured to check the authenticity of bills;

a conveyance component for conveying bills to the discrimination component;

a temporary stacker for temporarily holding bills that have undergone a discrimination process;

a storage box for storing bills; and a control component, wherein:

the control component is configured to control the conveyance component so that bills discriminated as genuine bills by the discrimination component are conveyed to the temporary stacker and bills discriminated as reject bills are conveyed directly to the deposit/withdraw port without going through the temporary stacker, and the control component further is configured to control the discrimination component and the conveyance component so that the reject bills conveyed again to the deposit/withdraw port and the bills discriminated as genuine bills conveyed to the temporary stacker are conveyed to the discrimination component for re-discrimination while a shutter of the deposit/withdraw port is closed, when certain conditions for re-discrimination are met, and the bills conveyed to the discrimination component are checked again, and the control component is further configured to convey bills discriminated as reject bills in the re-discrimination process to the deposit/withdraw port, open the shutter of the deposit/withdraw port so as to return the reject bills to the user, present the re-discrimination results to the user, carry out a deposit process for depositing bills re-discriminated as genuine bills in response to a deposit command entered by the user, and convey the bills discriminated as genuine bills in the re-discrimination process from the temporary stacker to the storage box for storage.

2. A bill handling machine for handling bills, which is operated by a user, comprising:

a deposit port for depositing bills;

a discrimination component for checking the authenticity of bills;

a temporary holding component for temporarily holding bills;

a storage box for storing bills; and a control component, said control component comprising:

a discrimination function when deposits are counted, wherein bills deposited through the deposit port are checked by the discrimination component and are then conveyed to the temporary holding component; and a re-discrimination function, wherein:

when a discrimination of the bills by the discrimination component meets certain conditions, bills image data that has been obtained for a bill discriminated as genuine and a bill discriminated as a reject bill is checked again by the discrimination component while the bills are temporarily held in the temporary holding component, and the re-discrimination function of the control component is configured to convey any bill discriminated as a reject bill in the re-discrimination process to the deposit/withdraw port, open the deposit/withdraw port so as to return the reject bill to the user, present the re-discrimination results to the user, carry out a deposit process for depositing any bill re-discriminated as genuine in response to a deposit command entered by the user, and convey the bill discriminated as genuine in the re-discrimination process from the temporary holding component to the storage box for storage.

3. A bill handling machine according to claim 2, wherein the control component checks the bills again by means of the re-discrimination component when an account related to the use depositing bills through the deposit port has been determined to be an account requiring special attention.

4. A bill handling machine according to claim 2, wherein the control component checks the bills again by means of the re-discrimination component when more than a certain number or more than a certain percentage of bills are rejected as a result of the bills being checked by the discriminating function when the deposit is counted.

5. A bill handling machine according to claim 2, wherein the discrimination component comprises an image retaining component for acquiring and retaining bills image data using a certain resolution, a first resolution discrimination component for checking the image data retained in the image retaining component using a resolution that is lower than the certain resolution, and a second resolution discrimination component for checking the image data retained in the image retaining component by using a resolution that is higher than the one used in the first resolution discrimination component.

6. A bill handling machine according to claim 5, wherein the control component checks the bills by means of the first resolution discrimination component of the discrimination component when the bills are checked by the discrimination function when the deposit is counted, and checks the bills again by means of the second resolution discrimination component of the discrimination component when the bills are checked again by the re-discrimination function.

7. A bill handling machine according to claim 2, wherein the temporary holding component includes a first temporary holding component that temporarily holds bills discriminated as genuine bills and a second temporary holding component that temporarily holds bills discriminated as reject bills, and the deposit port also functions as the second temporary holding component.

8. A bill handling machine for handling bills, which is operated by a user, comprising:

a deposit port for depositing bills;

a discrimination component for checking bills;

a temporary holding component for temporarily holding bills;

a storage box for storing bills; and a control component, said control component comprising:

a discrimination function when deposits are counted, wherein bills deposited through the deposit port are checked by the discrimination component and are then conveyed to the temporary holding component; and a re-discrimination function for selecting as needed either of:

a first discrimination function in which bills held in the temporary holding component including a bill discriminated as a genuine bill and a bill discriminated as a reject bill are conveyed to the discrimination component, the conveyed bills are checked again by the discrimination component, and then conveyed to the temporary holding component, and a second discriminating function in which bills image data that has been obtained for the discriminated bills is checked again by the discrimination component while the bills are held in the temporary holding component.

wherein the re-discrimination function of the control component is configured to convey any bill discriminated as a reject bill in the re-discrimination process to the deposit/withdraw port, open the deposit/withdraw port so as to return the reject bill to the user, present the re-discrimination results to the user, carry out a deposit process for depositing any bill re-discriminated as genuine in response to a deposit command entered by the user, and convey the bill discriminated as genuine in the re-discrimination process from the temporary holding component to the storage box for storage.

9. A bill handling machine according to claim 8, wherein the control component checks the bills again by means of the re-discrimination function when an account related to the use depositing of bills through the deposit port is an account determined to be in need of special attention.

10. A bill handling machine according to claim 8, wherein the control component checks the bills again by means of the re-discrimination function when more than a certain number of bills or more than a certain percentage of bills have been rejected as a result of the bills being checked by the discrimination function when the deposit is counted.

11. A bill handling machine according to claim 8, wherein the temporary holding component includes a first temporary holding component that temporarily holds bills discriminated as genuine bills and a second temporary holding component that temporarily holds bills discriminated as reject bills, and the deposit port also functions as the second temporary holding component.

12. A bill handling machine for handling bills, which is operated by a user, comprising:

a deposit/withdraw port configured to allow deposit and withdrawal of bills;

a discrimination component configured to check the authenticity of bills;

a conveyance component for conveying bills to the discrimination component;

a temporary holding component for temporarily holding bills that have undergone a discrimination process, in separate groups of bills discriminated as genuine bills and bills discriminated as reject bills;

a re-discrimination control component configured to control the discrimination component and the conveyance component so that the bills discriminated as genuine bills and the bills discriminated as reject bills held in the temporary holding component are conveyed again to the discrimination component while a shutter of the deposit/withdraw port is closed, when a transaction associated with a bills deposit is carried out for an account determined to require special attention, and so that the bills conveyed again to the discrimination component are checked again; and a storage box for storing bills, wherein the re-discrimination control component is further configured to convey bills discriminated as reject bills in the re-discrimination process to the deposit/withdraw port, open the shutter of the deposit/withdraw port so as to return the reject bills to the user, present the re-discrimination results to the user, carry out a deposit process for depositing bills re-discriminated as genuine bills in response to a deposit command entered by the user, and convey the bills discriminated as genuine bills in the re-discrimination process from the temporary holding component to the storage box for storage.

13. A bill handling machine according to claim 12, wherein the temporary holding component includes a first temporary holding component that temporarily holds the bills discriminated as genuine bills and a second temporary holding component that temporarily holds the bills discriminated as reject bills, and the deposit/withdraw port also functions as the second temporary holding component.

14. A bill handling machine for handling bills, which is operated by a user, comprising:

a deposit/withdraw port configured to allow deposit and withdrawal of bills;

a discrimination component configured to check the authenticity of bills;

a conveyance component for conveying bills to the discrimination component;

a temporary holding component for temporarily holding bills that have undergone a discrimination process, in separate groups of bills discriminated as genuine bills and bills discriminated as reject bills;

a re-discrimination control component configured to control the discrimination component and the conveyance component so that the bills discriminated as genuine bills and the bills discriminated as reject bills held in the temporary holding component are conveyed again to the discrimination component while a shutter of the deposit/withdraw port is closed, when more than a certain number of reject bills or more than a certain percentage of reject bills are detected, and so that the bills conveyed again to the discrimination component are checked again; and a storage box for storing bills, wherein the re-discrimination control component is further configured to convey bills discriminated as reject bills in the re-discrimination process to the deposit/withdraw port, open the shutter of the deposit/withdraw port so as to return the reject bills to the user, present the re-discrimination results to the user, carry out a deposit process for depositing bills re-discriminated as genuine bills in response to a deposit command entered by the user, and convey the bills discriminated as genuine bills in the re-discrimination process from the temporary holding component to the storage box for storage.

15. A bill handling machine for handling bills, which is operated by a user, comprising:

a deposit/withdraw port configured to allow deposit and withdrawal of bills;

a discrimination component configured to check the authenticity of bills, wherein the discrimination component includes an image retaining component for acquiring and retaining image data of bills of a certain resolution, and the discrimination component functions to lower the resolution of the image data retained in the image retaining component and to check the image data using the lowered resolution;

a conveyance component for conveying bills to the discrimination component;

a temporary holding component for temporarily holding bills that have undergone a discrimination process, in separated groups of bills discriminated as genuine and bills discriminated as reject bills;

a re-discrimination control component configured to control the discrimination component and the conveyance component so that the bills discriminated as genuine bills and the bills discriminated as reject bills held in the temporary holding component are conveyed again to the discrimination component while a shutter of the deposit/withdraw port is closed, when certain conditions for re-discrimination are met, and so that the bills conveyed again to the discrimination component are checked again using the image data of the certain resolution retained in the image retaining component; and a storage box for storing bills, wherein the re-discrimination control component is further configured to convey bills discriminated as reject bills in the re-discrimination process to the deposit/withdraw port, open the shutter of the deposit/withdraw port so as to return the reject bills to the user, present the re-discrimination results to the user, carry out a deposit process for depositing bills re-discriminated as genuine bills in response to a deposit command entered by the user, and convey the bills discriminated as genuine bills in the re-discrimination process from the temporary holding component to the storage box for storage.

16. A bill handling machine for handling bills, which is operated by a user, comprising:

a deposit/withdraw port configured to allow deposit and withdrawal of bills;

a discrimination component configured to check the authenticity of bills;

a conveyance component for conveying bills to the discrimination component;

a temporary holding component for temporarily holding bills that have undergone a discrimination process using a set of discrimination conditions, in separate groups of bills discriminated as genuine bills and bills discriminated as reject bills;

a re-discrimination control component configured to control the discrimination component and the conveyance component so that the bills discriminated as genuine bills and the bills discriminated as reject bills held in the temporary holding component are conveyed again to the discrimination component while a shutter of the deposit/withdraw port is closed, when certain conditions for re-discrimination are met, and so that the bills conveyed again to the discrimination component are checked again using changed discrimination conditions; and a storage box for storing bills, wherein the re-discrimination control component is further configured to convey bills discriminated as reject bills in the re-discrimination process to the deposit/withdraw port, open the shutter of the deposit/withdraw port so as to return the reject bills to the user, present the re-discrimination results to the user, carry out a deposit process for depositing bills re-discriminated as genuine bills in response to a deposit command entered by the user, and convey the bills discriminated as genuine bills in the re-discrimination process from the temporary holding component to the storage box for storage.

17. A bill handling machine according to claim 16, wherein the discrimination component executes the discrimination process based on a bill image data, and the re-discrimination control component causes the discrimination component to execute the discrimination process with higher image data resolution when the discrimination process is carried out again.

18. A bill handling machine according to claim 16, wherein the discrimination component is configured for discrimination by a plurality of discriminating methods, and the re-discrimination control component causes the discrimination component to execute a different discrimination than that used during the deposit when the discrimination process is carried out again.

19. A bill handling machine according to claim 16, wherein the discrimination component executes the discrimination process based on data obtained from some areas of the bills, and the re-discrimination control component controls the conveyance component in such a way that the bills are conveyed differently than when the bills were conveyed during the deposit, and allows the discrimination component to execute the discrimination process on a different area when the discrimination process is carried out again.

20. A bill handling machine according to claim 16, wherein the temporary holding component includes a first temporary holding component that temporarily holds the bills discriminated as genuine bills and a second temporary holding component that temporarily holds the bills discriminated as reject bills, and the deposit/withdraw port also functions as the second temporary holding component.

21. A bill handling machine for handling bills, which is operated by a user, comprising:

a deposit/withdraw port configured to allow deposit and withdrawal of bills;

a discrimination component configured to check the authenticity of bills;

a conveyance component for conveying bills to the discrimination component;

a temporary holding component for temporarily holding bills that have undergone a discrimination process in separate groups of bills discriminated as genuine bills and bills discriminated as reject bills;

a re-discrimination control component configured to control the discrimination component and the conveyance component so that the discrimination process is carried out again on all of the bills held in the temporary holding component while a shutter to the deposit/withdraw port is closed, when certain conditions for re-discrimination are met; and a storage box for storing bills, wherein the re-discrimination control component is further configured to convey bills discriminated as reject bills in the re-discrimination process to the deposit/withdraw port, open the shutter of the deposit/withdraw port so as to return the reject bills to the user, present the re-discrimination results to the user, carry out a deposit process for depositing bills re-discriminated as genuine bills in response to a deposit command entered by the user, and convey the bills discriminated as genuine bills in the re-discrimination process from the temporary holding component to the storage box for storage.

22. A bill handling machine according to claim 21, wherein the temporary holding component includes a first temporary holding component that temporarily holds the bills discriminated as genuine bills and a second temporary holding component that temporarily holds the bills discriminated as reject bills, and the deposit/withdraw port also functions as the second temporary holding component.

23. A bill handling machine for handling bills, which is operated by a user, comprising:

a deposit/withdraw port configured to allow deposit of bills and return of the deposited bills;

a discrimination component for checking the authenticity of bills, the discrimination component including an image retaining component for acquiring and retaining bills image data using a certain resolution and carrying out a discrimination process using the image data retained in the image retaining component;

a conveyance component for conveying bills to the discrimination component;

a temporary stacker for temporarily holding bills that have undergone the discrimination process;

a control component, wherein:

the control component is configured to control the conveyance component so that bills discriminated as genuine bills by the discrimination component are conveyed to the temporary stacker and bills discriminated as reject bills are conveyed directly to the deposit/withdraw port without going through the temporary stacker, and the control component is further configured to allow the discrimination component to carry out the discrimination process again by using the image data for the bills discriminated as genuine bills and the bills discriminated as reject bills retained in the image retaining module, while bills are temporarily held in the temporary stacker and a shutter of the deposit/withdraw port is closed, when certain conditions for re-discrimination are met; and a denominational stacker for temporarily holding the bills discriminated as genuine bills, wherein the control component is further configured to control the conveyance component so that the re-discrimination results are presented to the user, a deposit process for depositing bills re-discriminated as genuine bills is carried out in response to a deposit command entered by the user, the bills discriminated as genuine bills as a result of the re-discrimination are held in the denominational stacker and bills discriminated as reject bills may be returned to the user by opening the shutter of the deposit/withdraw port.

24. A bill handling machine according to claim 23, wherein the control component allows the discrimination component to carry out the discrimination process again when a transaction associated with bills deposit is carried out for an account determined to require special attention.

25. A bill handling machine according to claim 23, wherein the control component allows the discrimination component to carry out the discrimination process again when more than a certain number of reject bills or more than a certain percentage of reject bills are detected.

26. A bill handling machine according to claim 23, wherein the discrimination component further includes:

a first resolution discrimination component for checking the image data retained in the image retaining component using a resolution that is lower than the certain resolution, and a second resolution discrimination component for checking the image data retained in the image retaining component using a resolution that is higher than the one used in the first resolution discrimination component, wherein the discrimination component allows the second resolution discrimination component to function for the re-discrimination.

* * * * *